United States Patent [19]

Schutten et al.

[11] Patent Number: 4,624,533
[45] Date of Patent: Nov. 25, 1986

[54] SOLID STATE DISPLAY

[75] Inventors: Herman P. Schutten, Milwaukee, Wis.; Robert W. Lade, Fort Myers, Fla.; James A. Benjamin, Waukesha; Stanley V. Jasolski, Sussex; Gordon B. Spellman, Mequon, all of Wis.

[73] Assignee: Eaton Corporation, Cleveland, Ohio

[21] Appl. No.: 482,695

[22] Filed: Apr. 6, 1983

[51] Int. Cl.$^4$ .............................................. G02F 1/015
[52] U.S. Cl. ...................................... 350/354; 350/356
[58] Field of Search ............... 350/356, 370, 354, 386, 350/393; 365/114, 115

[56] References Cited

U.S. PATENT DOCUMENTS

| | | | |
|---|---|---|---|
| 2,692,950 | 10/1954 | Wallace | 350/355 X |
| 2,692,952 | 10/1954 | Briggs | 350/355 |
| 3,158,746 | 12/1960 | Leovec | 350/355 |
| 3,200,259 | 8/1965 | Braunstein | 350/354 |
| 3,259,016 | 7/1966 | Rosenblum | 350/355 |
| 3,271,578 | 9/1966 | Bockemuehl | 350/355 |
| 3,491,241 | 1/1970 | Lehovic | 350/370 X |
| 3,742,600 | 7/1973 | Lowell | 350/355 |
| 3,761,895 | 9/1973 | Ellis et al. | 365/114 X |
| 3,801,966 | 4/1974 | Terao | 365/115 X |
| 3,924,931 | 12/1975 | Cheo | 350/356 X |
| 3,950,078 | 4/1976 | Zatsky | 350/345 |
| 4,391,901 | 6/1983 | Land et al. | 350/356 X |

FOREIGN PATENT DOCUMENTS 0868275  5/1961  United Kingdom ............... 350/386

OTHER PUBLICATIONS

"The Optical Computer", Abraham et al, *Scientific American* Feb., 1983, pp. 85–93.

Primary Examiner—John K. Corbin
Assistant Examiner—David Leis
Attorney, Agent, or Firm—Andrus, Sceales, Starke & Sawall

[57] ABSTRACT

A solid display is provided by a semiconductor switched between transparent and opaque conditions according to external removal of carriers from the conduction band for controlling absorption of light-energy. A semiconductor has an energy band gap affording a normally saturated conduction band in response to impinging light energy of a given range wavelength. The normally saturated condition of the semiconductor prevents further absorption, and enables light to pass therethrough. The semiconductor is switched to an opaque condition by completing an electric circuit for removing carriers from the conduction band to enable further absorption of incident light in the semiconductor by raising additional carriers from the valence band to the conduction band.

1 Claim, 3 Drawing Figures

SOLID STATE DISPLAY

BACKGROUND AND SUMMARY

The invention provides a solid state display particularly useful as an alternative to LCDs (liquid crystal displays) and LEDs (light emitting diodes), as well as having numerous other applications. As a display, the invention overcomes problems of lifetime, temperature range limitations, and other constraints of prior displays.

The present invention provides a normally transparent semiconductor which is made opaque by removing carriers from the otherwise saturated conduction band. This enables further absorption of incident light in the semiconductor by raising additional carriers to the conduction band. The semiconductor becomes opaque because it can absorb the incident photons. In the disclosed embodiment, means are provided for completing an electric circuit for removing carriers from the conduction band. When the circuit is switched off or open, exiting carrier flow is stopped and the conduction band saturates. This saturated condition prevents further absorption of incident photons, whereby light passes through the semiconductor.

The raising of carriers to the conduction band for changing the refractive index of a semiconductor is known, "The Optical Computer", Abraham et al, *Scientific American*, February, 1983, pages 85-93, especially page 92. A constant intensity incident beam shines on the semiconductor and is absorbed, page 90, second figure. An additional probe beam causes saturation of the conduction band, resulting in sharply increased transmitted intensity of the beam through the semiconductor, i.e. from an off or opaque condition to an on or transparent condition. Removal of the additional optical probe beam returns the semiconductor to its off or opaque condition. This optical switch is proposed as the building block for a computer based on beams of light rather than electric currents. The optical switch is called a transphasor, and is referred to as the optical analog of the transistor, with the optical probe beam being the triggering or base drive for the transistor.

DETAILED DESCRIPTION

Figure 1:
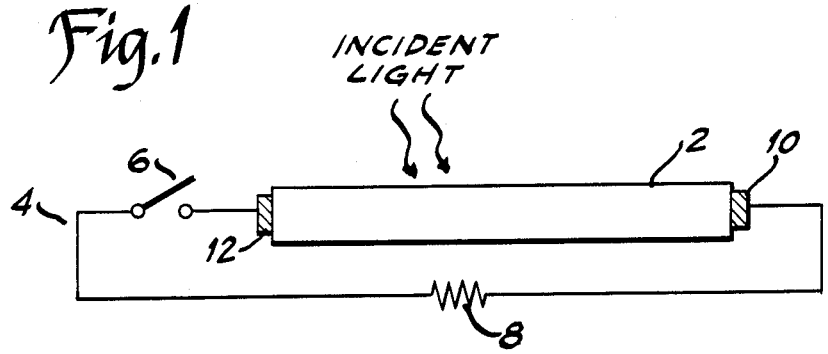
FIG. 1 is a schematic illustration of a solid state display constructed in accordance with the invention.

FIG. 1 shows a solid state display comprising a semiconductor 2 having a band gap in a given range wavelength of incident light such that light energy in the given range inpinging thereon raises carrier energy level from the valence band to the conduction band and saturates the conduction band to prevent further absorption. The remaining photons in the incident light beam thus pass through the semiconductor, whereby semiconductor 2 is normally light-transmissive. Means 4 are provided for removing carriers from the conduction band to enable semiconductor 2 to further absorb the remaining photons in the incident light beam by raising additional carriers to the conduction band. Semiconductor 2 then becomes opaque due to absorption of the remaining photons in the incident light beam. The incident light beam thus does not pass through semiconductor 2.

Means 4 comprises electric control means having an ON state removing carriers and affording an opaque semiconductor 2, and having an OFF state preventing removal of carriers and affording a light-transmissive semiconductor 2. Electric control means 4 includes switch means 6 connected in circuit with semiconductor 2 through load resistance 8. Switch 6 has an ON or closed state completing a circuit for carrier flow out of the semiconductor. Switch 6 has an OFF or open state interrupting the circuit and blocking carrier flow out of the semiconductor. The semiconductor thus has a normally saturated conduction band in response to impinging light energy in the given range wavelength; and means are provided for desaturating the conduction band, without reducing incident light intensity, to enable further absorption of incident light.

The bias for driving the carriers out of the semiconductor may be provided by carrier concentration gradients in the semiconductor, as hole-electron pairs are generated in response to the incident light. These gradients may appear at junction edge interfaces such as ohmic metallization connections 10 and 12. If such gradient or bias is not sufficient for a particular application, then a voltage source 14, FIG. 2, may be used for driving the carriers when the circuit is completed upon closing of switch 6. In a further alternative, FIG. 3, the semiconductor may include p and n type layers 16 and 18 to afford a PN junction 20 as in a photovoltaic diode or solar cell. When light falls on junction 20 hole-electron pairs are generated and the density of carriers diffusing across the junction will increase. The differential voltage across the junction biases carrier flow through circuit 22 upon closure of switch 24.

Figure 2:
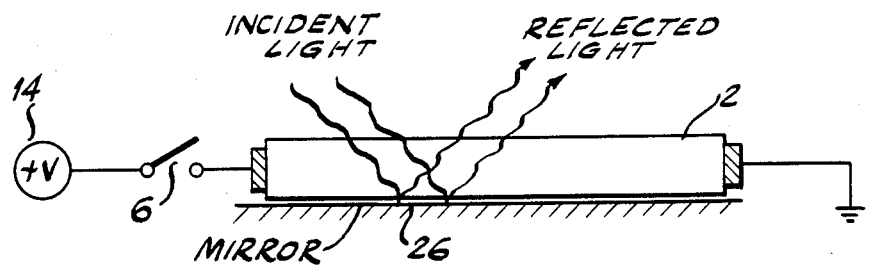
FIG. 2 shows an alternate embodiment of FIG. 1, particularly suited as a replacement for an LCD array.

FIG. 2 is particularly suited to display applications currently using LCDs or LEDs. A mirror 26 is adjacent semiconductor 2 for receiving light through the semiconductor and for reflecting the received light back through the semiconductor, when the latter is transmissive.

Figure 3:
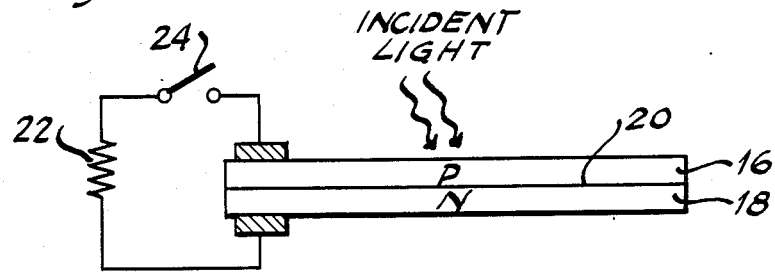
FIG. 3 shows a further alternate embodiment in accordance with the invention.

The invention contemplates numerous applications and modifications. For example, an alternative to the PN junction in FIG. 3 is a PIN layer structure. The device need not be single crystalline, and may instead be formed by a heterojunction structure. A band gap within the range of visible light is preferred for widest application, though other wavelength band gaps are of course permissible.

I claim:

1. A method for controlling transmission of light comprising:
   providing a semiconductor;
   directing short wavelength light onto said semiconductor, said short wavelength light having an energy greater than the energy bandgap of said semiconductor to raise carriers from the valence band to the conduction band in said semiconductor and saturate said conduction band to prevent further absorption such that the remaining photons in the incident short wavelength light pass through said semiconductor such that said semiconductor is normally transparent to said incident short wavelength light; and providing an ohmic connection to said semiconductor completing an electric circuit and electrically removing carriers from said conduction band and desaturating said conduction band without reducing incident light intensity, to enable further absorption of said incident short wavelength light in said semiconductor by raising additional carriers to said conduction band such that said semiconductor becomes opaque to said incident short wavelength light.

* * * * *